United States Patent [19]
Hsu et al.

[11] Patent Number: 5,483,240
[45] Date of Patent: Jan. 9, 1996

[54] RADAR TERRAIN BOUNCE JAMMING DETECTION USING GROUND CLUTTER TRACKING

[75] Inventors: Yuan S. Hsu, Rolling Hills Est.; Andy G. Laquer, Tustin, both of Calif.

[73] Assignee: Rockwell International Corporation, Seal Beach, Calif.

[21] Appl. No.: 314,028

[22] Filed: Sep. 28, 1994

[51] Int. Cl.⁶ ........................................................ G01S 7/36
[52] U.S. Cl. ............................................... 342/17; 342/13
[58] Field of Search ................................. 342/13, 16, 17

[56] References Cited

U.S. PATENT DOCUMENTS

| | | | |
|---|---|---|---|
| 3,597,762 | 8/1971 | DiMatteo | 342/16 |
| 3,900,870 | 8/1975 | Foin, Jr. et al. | 342/16 |
| 4,063,239 | 12/1977 | Johnson | 342/17 |

FOREIGN PATENT DOCUMENTS

| | | | |
|---|---|---|---|
| 125679 | 10/1981 | Japan | 342/16 |

Primary Examiner—Stephen M. Johnson
Attorney, Agent, or Firm—George A. Montanye; David J. Arthur; Susie H. Oh

[57] ABSTRACT

A radar jamming detection system is suitable for recognizing and distinguishing the presence of jamming and, particularly, terrain bounce jamming. The radar system includes a transmitter and a receiver. The receiver receives true radar skin return signals, in addition to ground clutter signals and jamming signals. The true radar skin return signals and ground clutter signals are recognizable in accordance with a predetermined receiver passband. Estimated target location, velocity and frequency data, as provided by a cueing radar, is used to set up the receiver passband for the radar detection system. Ground clutter range and angle measurements are used to determine an estimated ground range at the jammer angle, which is then compared with the cue range to determine if the received signals are terrain bounce jamming signals.

11 Claims, 4 Drawing Sheets

RADAR TERRAIN BOUNCE JAMMING DETECTION USING GROUND CLUTTER TRACKING

BACKGROUND OF THE INVENTION

1. Field of the Invention

This invention relates to the detection of radar jamming, and particularly to terrain bounce jamming detection using ground clutter tracking.

2. Description of the Related Art

Radar systems typically operate by transmitting electromagnetic energy, or signals, at selected polarization angles. Depending upon the number and size of objects located within the radar environment, some of the signals will bounce off the objects and will be reflected back to the radar receiver. These signals define the object being detected, and thus comprise the "radar skin return," which is reflected off of the skin, or surface, or the detected object.

To mask the radar skin return, and thereby deter or avoid radar detection, certain electronic countermeasures have been developed. Active electronic or electromagnetic warfare operates by generating energy, in the form of noise, to deny effective operation of an enemy's electromagnetic sensors. This energy may be in the form of false or time-delayed signals which can deceive radio or radar devices and their operators. Noise and deception jamming techniques are common forms of electronic warfare countermeasures which operate on the characteristics of the initial electronic or electromagnetic power levels or frequencies. Noise jamming, for example, is the intentional generation of interfering signals which are intended to block a communication or radar system, or at least to impair its effectiveness. Typically, the jamming beam comprises a more powerful signal than the signal being jammed.

A variety of jammers are used today. One jamming technique is direct signal, or direct path, jamming in which an electromagnetic beam of greater amplitude than the jammed signal is transmitted toward the victim radar at the same frequency band as the signal being jammed. By using carefully selected noise modulation, substantial impairment of the intelligibility of reception of the incoming signal may be attained. To counter direct noise jamming, a radar may use a counter technique, called home-on jam (HOJ), to track the angle of the jammer signal. However, because the application of HOJ will home in on a reflected signal, it has been found that HOJ is ineffective against a terrain bounce jammer.

Terrain bounce jamming, in contrast to direct signal jamming, is used to provide a jamming signal from an angle different from the true jammer angle, and thus is generally more difficult to counter. The noise terrain bounce jammer presents a false target angle to the seeker, and therefore directs the missile interceptor away from the true target. A terrain bounce jammer may be implemented on an aircraft, missile, or other air devices. It is especially effective if the jammer is flying at a low altitude and transmits a noise-like continuous waveform toward the ground.

A conventional missile-borne radar may be implemented for initial detection and tracking of targets and possible jamming scenarios. This is generally a monopulse radar transmitting a pulsed signal which, upon return, indicates the range of the target, and doppler shift, and thus the relative velocity of the target, and the angle of the target. However, it has been found that terrain bounce jamming is often effective against monopulse radar systems since using HOJ, the radar homes in on the jamming signal without knowing precisely whether the signal is from the direct path or the target or a reflection off the ground. Thus, the tracking radar may not be able to differentiate whether the received jamming signals are being transmitted by a direct path jammer or a terrain bounce jammer.

Thus, it can be seen that to counter the effects of terrain bounce jamming and, therefore, detect and intercept the real target, HOJ has been found to be ineffective for counter-jamming. Using conventional HOJ, the seeker will determined, albeit incorrectly, that the target is located at some point on the ground from which the jamming signals appear to be reflected. As a result, the seeker will direct itself to hit the ground, rather than the rear target. Consequently, a detection and recognition scheme which can recognize the occurrence of terrain bounce jamming is desired.

SUMMARY OF THE INVENTION

Accordingly, it is an object of the present invention to provide a system and method of detecting, recognizing and intercepting continuous broadband noise terrain bounce jamming. In particular embodiments, the present invention is directed to a device and method for enabling a radar system to recognize the presence of terrain bounce jamming signals. The radar may be included on a missile or aircraft.

These and other objects are accomplished, according to an embodiment of the present invention, by a detection system and technique which utilizes ground clutter tracking to recognize and differentiate terrain or ground-bounce jamming signals which have been transmitted to present false target returns to a homing missile or other radar-guided device.

More particularly, against a low altitude target, a missile radar generally employs a waveform and processing scheme to separate the ground clutter from the expected target skin return in the spectral or doppler domain. The target range, range rate, and angle can then be measured accurately without the interference of the ground clutter. With terrain bounce noise jamming, however, only the angle of the jamming signal can be measured. After the jammer angle is determined, the missile radar may subsequently measure the ground return and obtain its range as well as angle. This is possible if the ground return is much stronger then the jammer signal which occupies the same doppler regime. By comparing the jammer angle and its predicted range (normally provided by another radar to the missile radar, e.g. a cueing radar) with the ground angle and range, a decision may be made whether the jamming signal is from the direct path or is reflected from the ground. Thus, terrain bounce jamming can be recognized.

Embodiments of the invention include a receiver and a transmitter coupled together via an antenna. These components may be mounted on a missile or other air-based device. A computer is implemented and programmed with logic to analyze the characteristics of the received signals relative to the transmitted signals. The detection logic incorporates ground clutter tracking in which the seeker line-of-sight ground range and angle are measured by shifting the estimated ground clutter signal to the seeker's doppler passband.

Since the frequency of the transmitted signals and the radar velocity are known, the frequency range of the ground clutter passband is also known. According to embodiment of the invention, effectively, the ground clutter can be moved out of the receiver passband, while the estimated target doppler is placed within the receiver passband. The jamming angle of the target is then determined according to monopulse angle measurements. Next, the ground clutter is moved back into the receiver passband so that the clutter properties can be examined. The clutter range and angle are then measured for multiple range bins.

Ultimately, linear squares fit calculation are made to establish a relationship between the clutter angle and ground range data. If the cue target range (as provided by the cueing radar) is longer than the ground at the same angle (below the ground surface), the computer can determine that terrain bounce jamming is present. If the cue range is determined to be shorter than the ground at the same angle (above the ground), the target is performing direct path jamming. Thus, if the estimated ground range is smaller than the target cue range, the computer will conclude that terrain bounce jamming is present, and can then choose an optical solution to counter the jamming.

BRIEF DESCRIPTION OF THE DRAWINGS

The detailed description will be made with reference to the accompanying drawings, wherein like numerals designate corresponding parts in the several figures.

DETAILED DESCRIPTION OF THE PREFERRED EMBODIMENTS

The following detailed description is not to be taken in a limiting sense, but is made merely for the purpose of illustrating the general principles of embodiments of the invention.

The present invention has been found to provide improved jamming recognition and identification capabilities in a radar system. In described embodiments of the invention, the radar may be included within a missile, or other types of homing devices. It will be recognized, however, that embodiments of the present invention may also be incorporated within many different types of signal detection, recognition, and tracking arrangements. For example, radar tracking embodiments of the invention may be mounted on military aircraft for identifying any incoming radar signals.

Direct path jamming and terrain or ground bounce jamming are typically used to divert the radar-guided missile from tracking the true target, e.g., the aircraft. To be able to defeat the jammer, however, the missile radar or radar seeker must be able to clearly distinguish the direct path jamming signals from terrain bounce signals. Preferred embodiments of the present invention enable immediate discrimination and recognition of terrain bounce jamming as compared to direct path jamming. As shown generally in FIG. 1, terrain bounce jamming is performed by directing jamming signals toward the ground, or terrain. Consequently, it appears to the radar seeker system that the signal is being transmitted from the ground. A false target angle is thus presented to the seeker, causing it to be directed away from the true target. Typically, a target or other object will send these jamming signals when it has recognized or otherwise determined that radar tracking is or may be occurring.

Thus, preferred embodiments of the present invention are directed to a radar system which estimates certain geometric characteristics of the expected clutter return signal as well as the target jammer characteristics, and enables the immediate recognition of terrain bounce jamming. As will be discussed in more detail below, the radar considers measured range and angle data which are fit into a least squares regression calculation to generate refined range and angle values to reduce the estimation error. As a result, the radar seeker can deduce that a jammer is present and can begin procedures to reacquire the skin return of the true, desired target.

Figure 1:
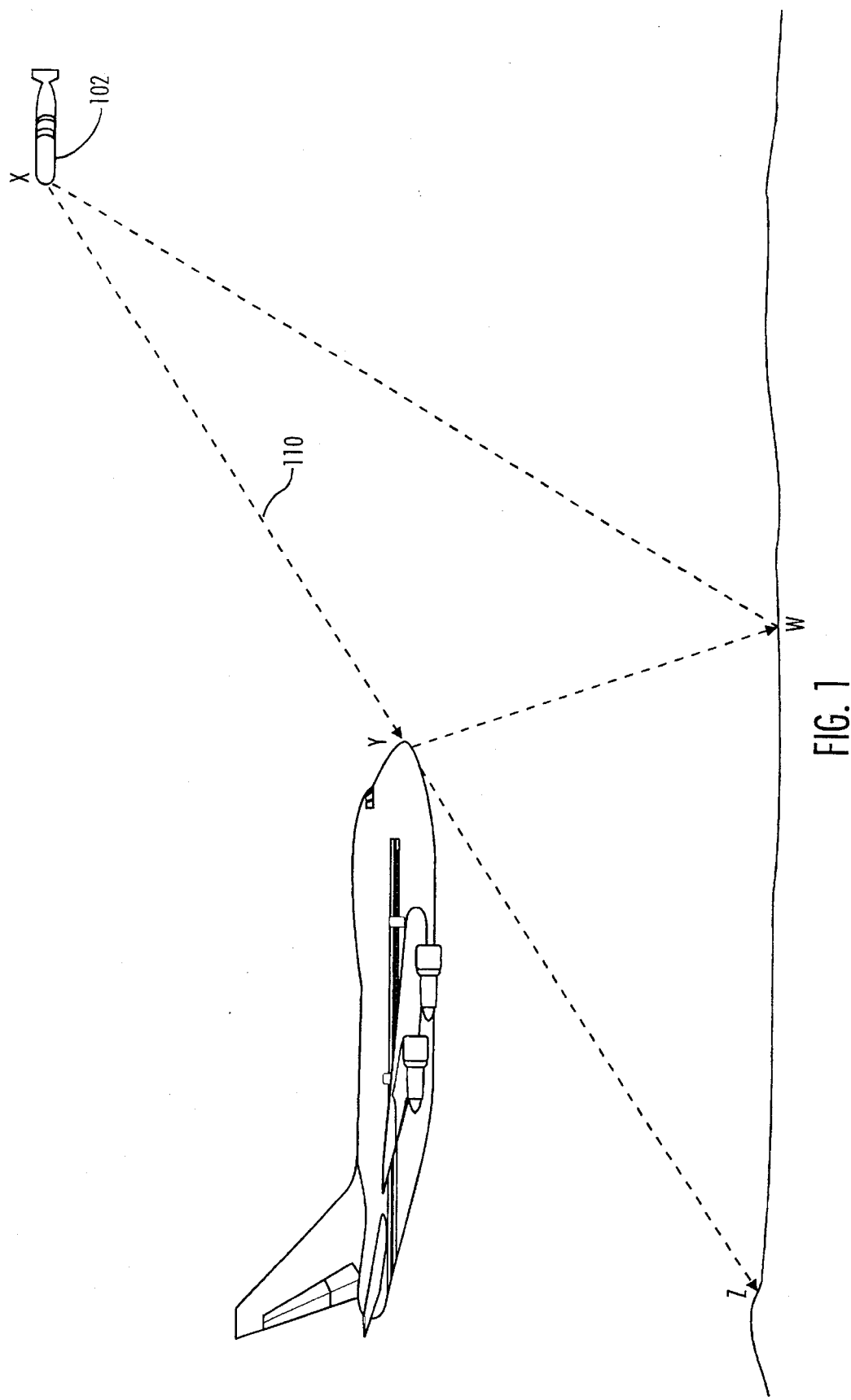
FIG. 1 is a pictorial representation of the detection operation of an embodiment of the present invention.
Figure 2:
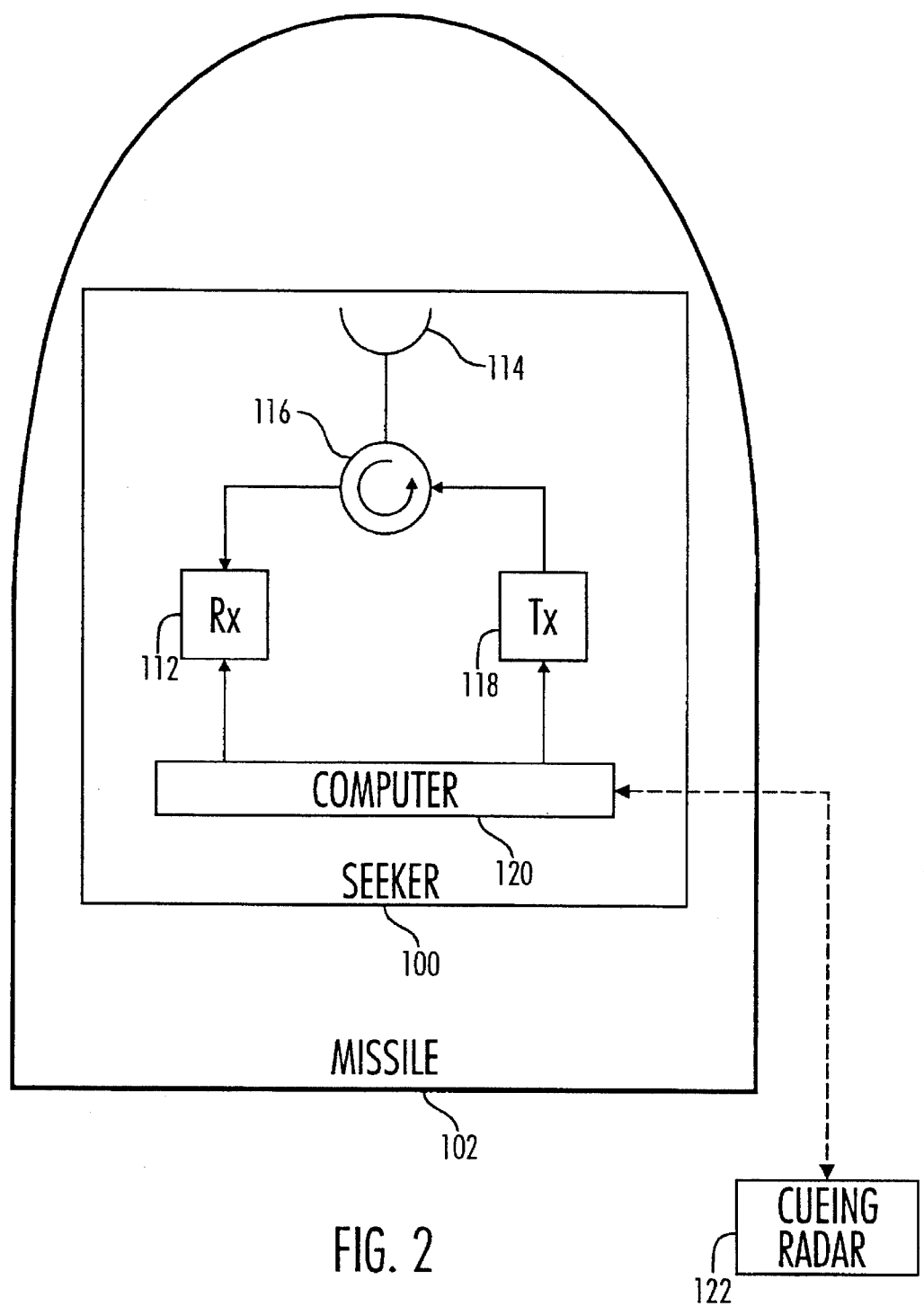
FIG. 2 is a general block diagram of an embodiment of the present invention.

Referring to FIGS. 1 and 2, in a preferred embodiment of the present invention, a radar device 100 is mounted within a missile 102. The radar seeker 100 transmits electromagnetic energy or signals 110, to detect possible targets or other objects. The transmitted power is generally concentrated in the direction of the target. The energy may strike the surface, or skin, of a variety of objects, including the desired target, and is then reflected off the skin. This skin return is then echoed back to the radar system to be analyzed by the radar.

As shown in FIG. 2, the radar system 100 includes a transmitter 118 and a receiver 112 coupled together via a circulator 116. The circulator 116, in turn, is coupled to a radar antenna 114. The seeker antenna 114 is preferably a monopulse antenna constructed to provide sufficient gain in transmit and to collect the echo power of a returning wave, i.e., the radar skin return, upon contact with an object. The antenna 114 may be conventionally gimbal-mounted or otherwise movably coupled to the radar system at the nose of the missile 102 (FIG. 1). The entire radar unit is preferably covered by a radome structure (not shown).

A computer processor 120 is coupled to the receiver and transmitter assembly to process the received data. The computer 120 operates in conjunction with a cueing radar system 122 (FIG. 2) which provides the approximate location of the desired target in terms of range, range rate and elevation angle. The cueing radar 122 is implemented to provide guidance and tracking assistance. The cueing radar may be ground-based or may be installed on another aircraft or within the missile itself.

Essentially, after the missile is launched, the cueing radar 122 directs the seeker to follow the estimated target trajectory. The cueing radar tracks the target and sends information to the seeker including the approximate target angle location and velocity, and the range to the target. This target range value is called the cue range. As will be discussed in more detail below, the cue range is used by the radar seeker to compare its own estimated target characteristic measurements, and deduce whether the target is performing terrain bounce jamming or direct path jamming.

Figure 3A:
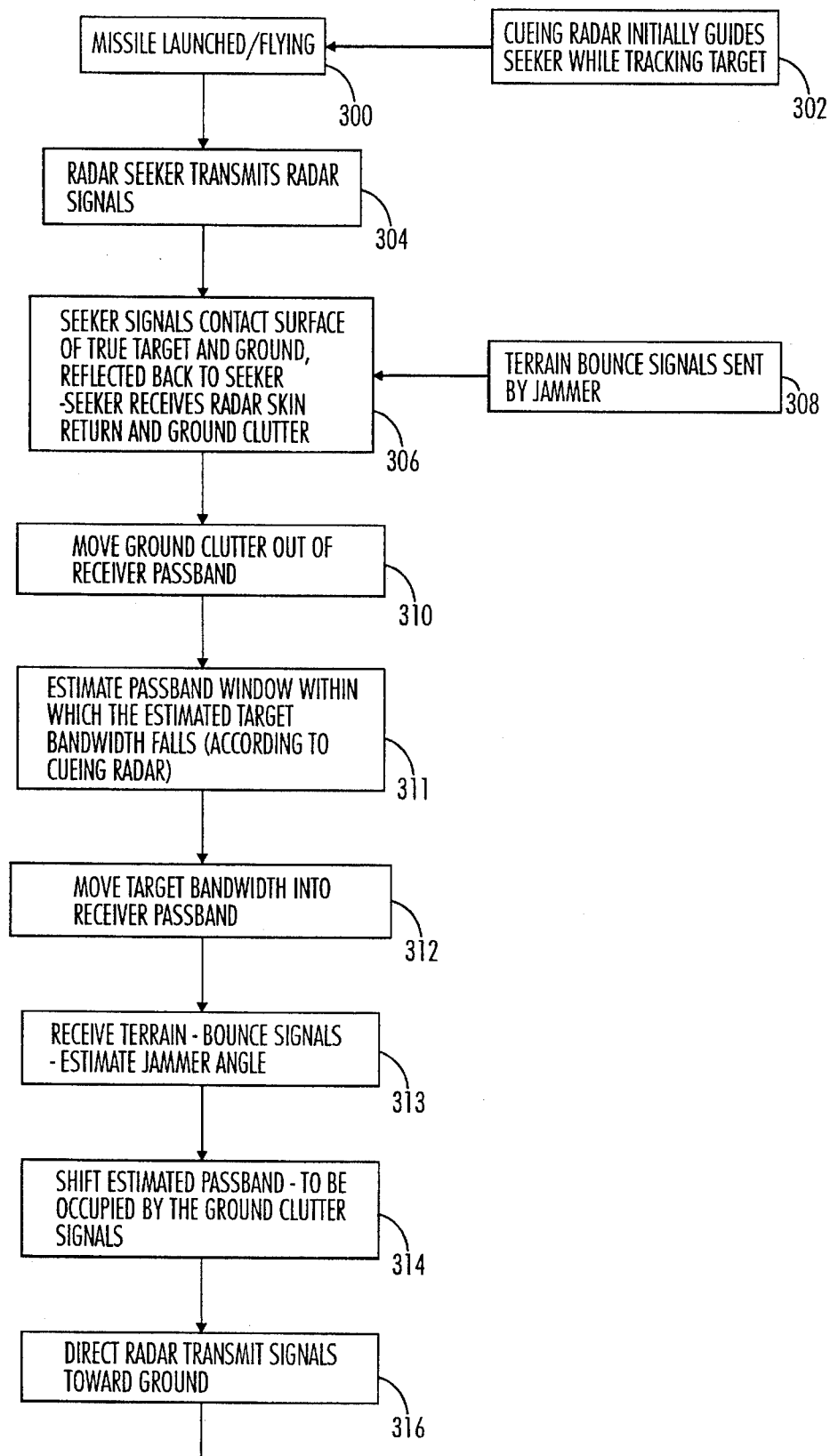
FIG. 3 is a flow chart describing the sequence of signal reception, detection, and recognition according to a preferred embodiment of the present invention.
Figure 3B:
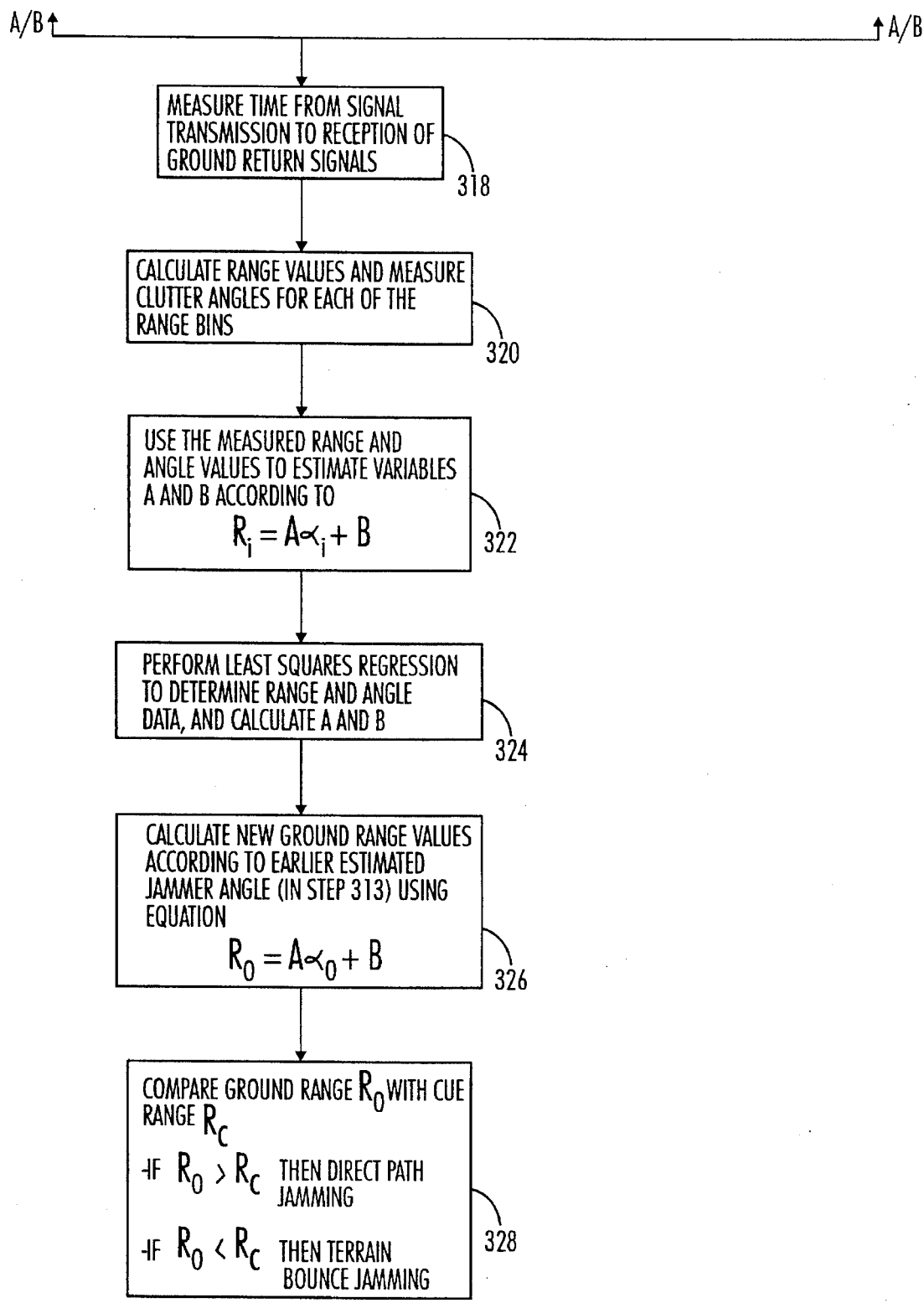

FIG. 3 is a flow diagram describing the seeker operation. Referring to the embodiments shown in FIGS. 1 and 3, the missile seeker is launched and travels about ground. (Step 300) In step 302, the cueing radar guides the seeker while tracking a desired target. The cueing radar informs the seeker of the target characteristics such as the target range, velocity, and angle. At step 304, which may occur simultaneously with steps 300 and 302, the on-board radar seeker preferably transmits radar signals generally in the direction of the expected target. When a target comes into view of the radar system, the radar signals hit the surface, or skin, of the target, causing the radar skin return to be reflected back toward the radar seeker. (Step 306) The radar seeker will also receive reflections from ground clutter.

As described briefly above, a jammer is typically mounted within or on the desired target to counter radar detection and tracking by the seeker. The jammer's function is to jam radar signals directed toward the jammer host, e.g., the target, and redirect the radar seeker toward a false target. Thus, the jammer mounted onboard the target may also be transmitting jamming signals to mask the radar skin return signals (Step 308) For the seeker to complete its mission, it must therefore discover the presence of jamming and ultimately counter the effects of the jamming signal.

Since the seeker is aware of its own velocity, and since it is generally travelling toward the target, there will be a positive doppler shift of the skin return. In addition, the seeker computer already knows the frequency spectrum of the ground clutter. Thus, in accordance with embodiments of the invention, the ground clutter bandwith is first moved out of the receiver's doppler passband to minimize interference with target detection and evaluation. (Step 310) At step 311, the passband window within which the target doppler falls is estimated using the cued target range rate provided by the cueing radar.

Next, the receiver passband can be placed around the predicted target doppler. (Step 312) The signal level in the receiver passband is compared with the thermal noise level. If there is high noise, attributable to thermal noise as well as a jammer, it may be concluded that a jamming is present.

The elevation angle of the jammer is then measured using monopulse techniques. (Step 313) Although it is known that a jammer is present, the radar seeker must recognize whether the jammer is performing direct path or terrain bounce jamming. Thus, to differentiate the particular type of jamming, the clutter angle is measured and compared with the jamming angle. The ground clutter return is generally much stronger than the jammer return at the clutter doppler so that a large clutter-to-interference ratio would be present, where the interference includes both thermal noise and the jammer signal in the clutter bandwidth.

Accordingly, in step 314, the ground clutter frequency is shifted to the seeker's passband. The clutter angle and range are measured for several range bins or gates. Each range bin is analogous to a particular window of time representing the range of the reflected signal to the seeker. Within each range gate, multiple time samples are collected and processed by the computer. In embodiments of the invention, a plurality of doppler filters are implemented for each range gate. In normal radar operation, the doppler filters match the doppler shift of the received return signals and enable differentiation between the target skin return and the background clutter.

Accordingly, the clutter ground range may be estimated as a function of the measured monopulse angle for each of the plurality of range bins. The radar seeker signals are transmitted toward the ground (step 316), and the time from signal transmission to reception of the ground return is measured at step 318. This time indicates the range of the ground clutter to the seeker. Range values are then calculated for each of the range bins. (Step 320) The clutter angle is also measured for each of the range bins using monopulse measurements. These measured values are used to estimate coefficients A and B according to the equation:

$$R_i = A * \alpha_i + B$$

where $R_i$ represents the measured range values (e.g., line XW shown in FIG. 1, where W may be any ground clutter range bin position), $\alpha_i$ equals the angle between the ground clutter and the radar horizon, and i is the range bin index. (Step 322) Least squares regression is performed at step 324 to establish the relationship between the angle and range data, and determine values for A and B.

Thus, inserting the calculated values of A and B into the equation:

$$R_o = A * \alpha_o + B$$

the ground range corresponding to the jammer angle may be estimated. (Step 326) The angle $\alpha_o$ is the measured jammer angle relative to the radar horizon when the ground clutter is out of the seeker passband. Thus, in accordance with preferred embodiments of the present invention, at step 328 the calculated ground range value $R_o$ (XY+YZ shown in FIG. 1) is compared with the cue range $R_c$ (approximately XY shown in FIG. 1), as provided by the cuing radar, to determine whether the calculated jammer range indicates the presence of a terrain bounce jammer or a direct path jammer. Particularly, if $R_o$ is less than $R_c$, i.e., $R_o < R_c$, the computer will determine that the skin return signals are terrain bounce jamming signals. If $R_o$ is greater than $R_c$, i.e., $R_o > R_c$, it can be determined that direct path jamming is occurring.

It will be recognized that other types and configurations of radar systems may be employed according to embodiments of the present invention. As mentioned above, for example, the cueing radar unit may not necessarily be ground-based, but rather may be mounted onboard an aircraft, ship or other moving vehicle. Moreover, it is contemplated that the cueing radar function may be provided internally within the missile, and its measurements either programmed into the radar computer processor or incorporated into another computer system.

The presently disclosed embodiments are to be considered in all respects as illustrative and not restrictive. The scope of the invention should only be limited by the appended claims, rather than the foregoing description, and all changes that come within the meaning and range of equivalency of the claims are, therefore, intended to be embraced therein.

What is claimed is:

1. A radar system for detecting and recognizing jamming signals transmitted by a target, the radar system being provided with a cue range defining a range to the target, wherein the radar system has a corresponding horizon, the radar system comprising:

means for measuring a jammer angle defined between the radar horizon and a line between the target and the radar system;

means for calculating a ground range corresponding to the measured jammer angle; and means for comparing the calculated ground range with the cue range, wherein if the ground range is less than the cue range, the jammer signals are classified as terrain bounce jamming signals.

2. The radar system of claim 1, wherein, after comparing the calculated ground range with the estimated cue range, if the ground range is greater than the cue range, the jamming signals are classified as direct path jammer signals.

3. The radar of claim 1, wherein the ground range is determined according to a least squares regression calculation.

4. A radar system for detecting and recognizing terrain bounce jamming signals, the radar system operable with a cueing radar which provides approximate location, velocity, and frequency data for a desired target, and determines a cue range defining a range to the target in accordance with the location, velocity, and frequency data, wherein the radar system has a corresponding radar horizon, the radar system comprising:

a transmitter for transmitting radio signals toward the target in accordance with the location and velocity data provided by the cueing radar, the transmitted radio signals being associated with a predetermined receiver passband;

a receiver for receiving return radio signals, the return radio signals including true radar skin return signals, ground clutter signals, and jamming signals, the true radar skin return signals and the ground clutter signals being associated with the predetermined receiver passband.

wherein the true radar skin return signals represent returning transmitted radio signals which have been reflected off the target, and the ground clutter signals represent returning transmitting radio signals which have been reflected off the ground; and processor means for processing the received signal according to the data provided by the cueing radar, wherein the processor means includes means for moving the ground clutter signals out of the receiver passband, means for measuring a jammer angle, wherein the jammer angle is defined between the radar horizons and a line between the target and the receiver, means for moving the ground clutter signals into the receiver passband, means for measuring at least one ground clutter angle, the ground clutter angle being defined between the radar horizon and a point on the ground where the returning transmitted radio signals have been reflected, means for measuring at least one ground clutter range value, the range being defined as the distance between the receiver and the point on the ground where the returning transmitted radio signals have been reflected, means for estimating a ground range at the measured jammer angle according to the at least one ground clutter angle and range value, and the measured jammer angle, and means for comparing the estimated ground range with the cue range, wherein if the ground range is less than the cue range, the received return radio signals are classified as terrain bounce jamming signals.

5. The radar system of claim 4, wherein the transmitted radar signals are associated with a main lobe, and further wherein multiple ground clutter angle and range values are measured for each of a plurality of time segments representing a plurality of range bins within the radar's main lobe defining estimated ranges to the jammer.

6. The radar system of claim 5, wherein the multiple ground clutter angles ($\alpha_i$) and ranges ($R_i$) and functionally related according to the equation $R_i = A^*\alpha_i + B$, the radar system further comprising means for estimating variables A and B according to a least squares regression analysis, wherein the ground range ($R_o$) at the jammer angle is estimated according to $R_o = A^*\alpha_o + B$, where $\alpha_o$ represents the measured jammer angle.

7. The radar system of claim 4, wherein, after comparing the estimated ground range at the jammer angle with the cue range, if the ground range is greater than the cue range, the received return radio signals are classified as direct path jammer signals.

8. A method for detecting and recognizing terrain bounce jamming signals, the method operable with a cueing radar which provides approximate location, velocity, and frequency data for a desired target, wherein the cueing radar determines a cue range defining a range between the target and the radar system according to the approximate location, velocity, and frequency data, the method comprising the steps of:

transmitting radio signals toward the target in accordance with the location and velocity data provided by the cueing radar, the transmitted radio signals being associated with a predetermined receiver passband;

receiving return radio signals, the return radio signals including true radar skin return signals, ground clutter signals, and jamming signals, the true radar skin return signals and the ground clutter signals being associated with the predetermined receiver passband, wherein the true radar skin return signals represent returning transmitted radio signals which have been reflected off the target, and the ground clutter signals represent returning transmitting radio signals which have been reflected off the ground; and processing the received signal according to the data provided by the cueing radar, wherein the step of processing includes shifting the ground clutter signals out of the receiver passband, measuring a jammer angle, wherein the jammer angle is defined between a line representing the radar horizons and a line between the target and the receiver, shifting the ground clutter signals into the receiver passband, measuring at least one ground clutter angle, the ground clutter angle being defined between the radar horizon and a point on the ground where the returning transmitted radio signals have been reflected, measuring at least one ground clutter range, the range being defined as the distance to the point on the ground where the returning transmitted radio signals have been reflected.

estimating a ground range at the jammer angle according to the ground clutter angle and range, and the measured jammer angle, and comparing the estimated ground range with the estimated cue range, wherein if the ground range is less than the cue range, classifying the received return radio signals as terrain bounce jamming signals.

9. The method of claim 8, further comprising the step of measuring multiple ground clutter angles and ranges for each of a plurality of time segments representing a plurality of range bins corresponding to the ground clutter range.

10. The method of claim 9, further comprising the steps of estimating variables A and B according to the measured ground clutter angles ($\alpha_i$) and range values ($R_i$), wherein $R_i = A^*\alpha_i + B$, and estimating the ground range ($R_o$) at the jammer angle according to $R_o = A^*\alpha_o + B$, where $\alpha_o$ represents the measured jammer angle.

11. The method of claim 8, wherein, after comparing the estimated ground range with the cue range, if the ground range is greater than the cue range, the received return radio signals are classified as direct path jammer signals.

* * * * *